No. 729,302. PATENTED MAY 26, 1903.
J. M. ERICKSON.
BELT FASTENER.
APPLICATION FILED JAN. 15, 1903.
NO MODEL.
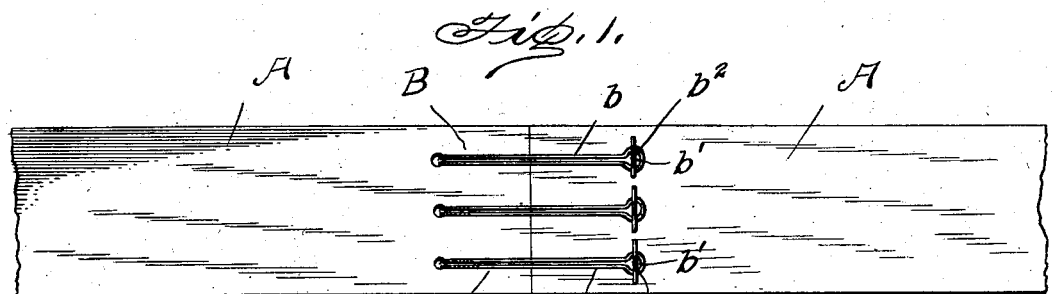
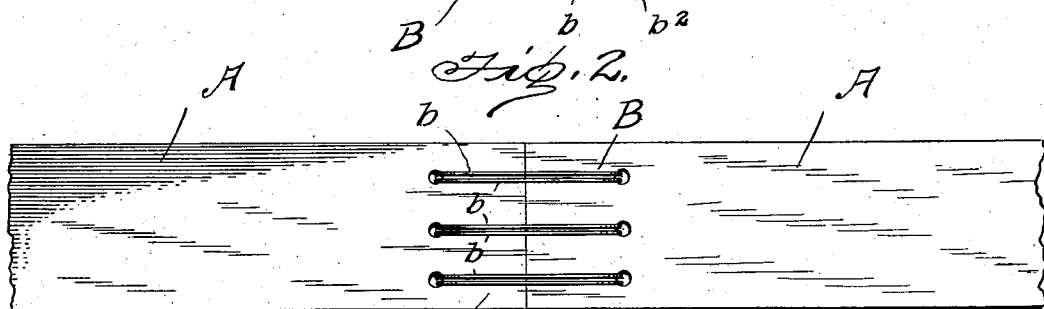
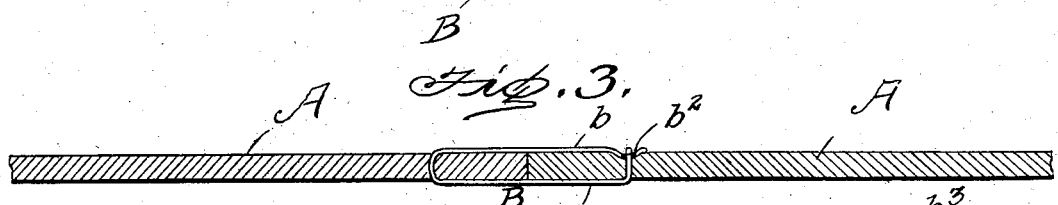
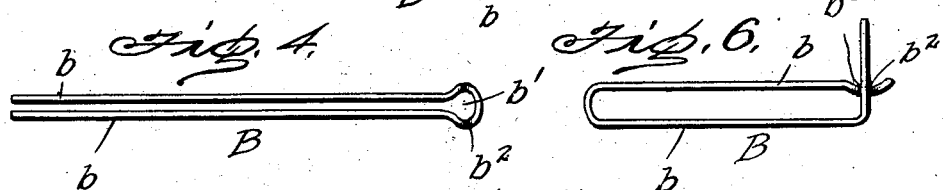
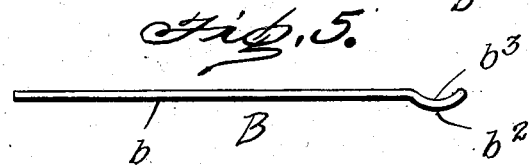
Inventor
John M Erickson
Witnesses
By H. D. Wilson
Attorney.

No. 729,302. Patented May 26, 1903.

UNITED STATES PATENT OFFICE.

JOHN M. ERICKSON, OF DULUTH, MINNESOTA.

BELT-FASTENER.

SPECIFICATION forming part of Letters Patent No. 729,302, dated May 26, 1903.

Application filed January 15, 1903. Serial No. 139,194. (No model.)

*To all whom it may concern:*

Be it known that I, JOHN M. ERICKSON, a citizen of the United States, residing at Duluth, in the county of St. Louis and State of Minnesota, have invented certain new and useful Improvements in Belt-Fasteners; and I do declare the following to be a full, clear, and exact description of the invention, such as will enable others skilled in the art to which it appertains to make and use the same.

This invention relates to belt-fasteners.

The object of the invention is to provide a belt-fastener which shall be simple in construction, durable in use and comparatively inexpensive of production, easily applied to and removed from the ends of the belt, and which when in position will securely retain the ends of the belt together.

With these and other objects in view the invention consists in certain features of construction and combination of parts, which will be hereinafter fully set forth.

In the accompanying drawings, Figure 1 is a front view of the abutting ends of the belt, illustrating the plan of the invention. Fig. 2 is a reverse view. Fig. 3 is a longitudinal vertical sectional view on line $x\ x$ of Fig. 1. Fig. 4 is a detail plan view of one of the fasteners. Fig. 5 is a side view of the same, and Fig. 6 is a view illustrating the manner of bending the fastener in the act of connecting the ends of the belt.

Referring to the drawings, A A denote the abutting ends of the belt.

B denotes the fastener. The fastener consists of a single piece of wire, doubled upon itself to form a bight, and a pair of parallel leg portions $b$. The bight is widened transversely to form an eye $b'$, the sides of which project laterally beyond the parallel leg portions, as at $b^2$, and are also curved, as shown in Fig. 5, to form a transverse depression $b^3$ on one side of the eye, which I will call the "outer" side thereof.

In connecting the ends of the belt the fastener is inserted through the holes in said ends and the free ends of the legs $b\ b$ inserted through the eye $b'$, caused to engage the notches formed by the lateral extensions $b^2$ of the eye, and bent in opposite directions, as shown in Fig. 1. By forming the eye $b'$ with the transverse depression seats are provided for the reception of the oppositely-bent ends of the legs, whereby a smooth surface is presented, thus making practically smooth joints of the legs with the eyes, and thereby reducing to a minimum the liability of the belt-fastener hooking or catching into anything with which it may possibly come into contact. By the provision of this depression the ends of the legs are prevented from becoming worn away and weakened by a belt-stretcher when the same is used, thus materially increasing the life of the fastener.

From the foregoing description, taken in connection with the accompanying drawings, the construction, operation, and advantages of the invention will be readily understood without requiring an extended explanation.

It will be apparent that the fasteners may be made at a very small cost, and they may be easily and quickly applied to the ends of the belt without removal of the material in the formation of the holes therein, as is necessary when belt-fasteners of the "stud" type are used, in which latter case the belt is materially weakened by the removal of the material to form the holes for the stud.

Various changes in the form, proportion, and the minor details of construction may be resorted to without departing from the principle or sacrificing any of the advantages of this invention.

Having thus described my invention, what I claim as new, and desire to secure by Letters Patent, is—

1. As a new article of manufacture, a belt-fastener, consisting of a piece of wire doubled upon itself to form a bight, constituting an eye, and parallel leg portions adapted to be doubled and to have their outer extremities passed through and engaged with the eye when the device is attached to the ends of a belt, substantially as described.

2. As a new article of manufacture, a belt-fastener comprising a piece of wire doubled upon itself to form a bight and leg portions, the bight being widened to form lateral extensions which project laterally beyond the leg portions and being further provided with a transverse depression for the purpose set forth, substantially as described.

In testimony whereof I have hereunto set my hand in presence of two subscribing witnesses.

JOHN M. ERICKSON.

Witnesses:
C. W. ELSTON,
C. A. BRITTS.